United States Patent [19]
Lenz et al.

[11] Patent Number: 5,453,585
[45] Date of Patent: Sep. 26, 1995

[54] CABLE RETRACTION SYSTEM

[75] Inventors: Vernon C. Lenz, Union Gap, Wash.; William Siska, Jr., Elma, N.Y.

[73] Assignee: Golden West Communications, Inc., Union Gap, Wash.

[21] Appl. No.: 278,016

[22] Filed: Jul. 20, 1994

[51] Int. Cl.⁶ .......................... H02G 11/02; F16M 13/02
[52] U.S. Cl. ...................... 191/12.2 R; 248/548
[58] Field of Search .............. 191/12 R, 12.2 R, 191/12.4; 248/548

[56] References Cited

U.S. PATENT DOCUMENTS

| | | |
|---|---|---|
| 1,247,672 | 11/1917 | Hallberg . |
| 2,374,457 | 4/1945 | Reeves ................ 191/12.2 R X |
| 2,374,457 | 5/1948 | Karp et al. . |
| 3,409,246 | 11/1968 | De Pas . |
| 3,483,898 | 12/1969 | Tini ................ 191/12.2 R X |
| 3,582,032 | 6/1971 | Placek ................ 248/548 |
| 3,657,491 | 4/1972 | Ryder et al. ............ 191/12.2 R |
| 3,733,478 | 5/1973 | Barker ................ 191/12.4 X |
| 3,785,464 | 1/1974 | Collins et al. . |
| 4,350,850 | 9/1982 | Kovacik et al. ........... 191/12.2 R |
| 4,384,688 | 5/1983 | Smith ................ 191/12.2 R X |
| 4,392,661 | 7/1983 | Langenstein ........... 191/122.2 R X |
| 4,757,955 | 7/1988 | Simmons ............. 191/12.2 R |

FOREIGN PATENT DOCUMENTS 0541320  5/1993  European Pat. Off. .......... 191/12.2 R

*Primary Examiner*—Michael S. Huppert
*Assistant Examiner*—Scott L. Lowe
*Attorney, Agent, or Firm*—Freilich Hornbaker Rosen

[57] ABSTRACT

A cable retraction system is described which includes a windup reel (16) and power springs (24, 26, 28) that urge the reel to turn and wind up a signal-carrying cable (20). An outer end (25) of each power spring is bent about 180° to form a hook that projects through a slot (72) in a windup drum (36) of the reel. A screw (44) projects through a lug (38) at the end of a cable wire, through a hole (71) in the spring, and into a threaded insert (50) set in the windup drum. A stationary axle (30) at the center of the reel, comprises a dielectric body (71) and a plurality of conductors (73, 75, 77) embedded in the body, each conductor having an outer end (58, 60, 62) at the end of the body to connect to wires of a second cable, and each conductor having an inner end (74, 76, 78) lying at the periphery of the axle and attached to an inner end (32) of a spring.

7 Claims, 4 Drawing Sheets

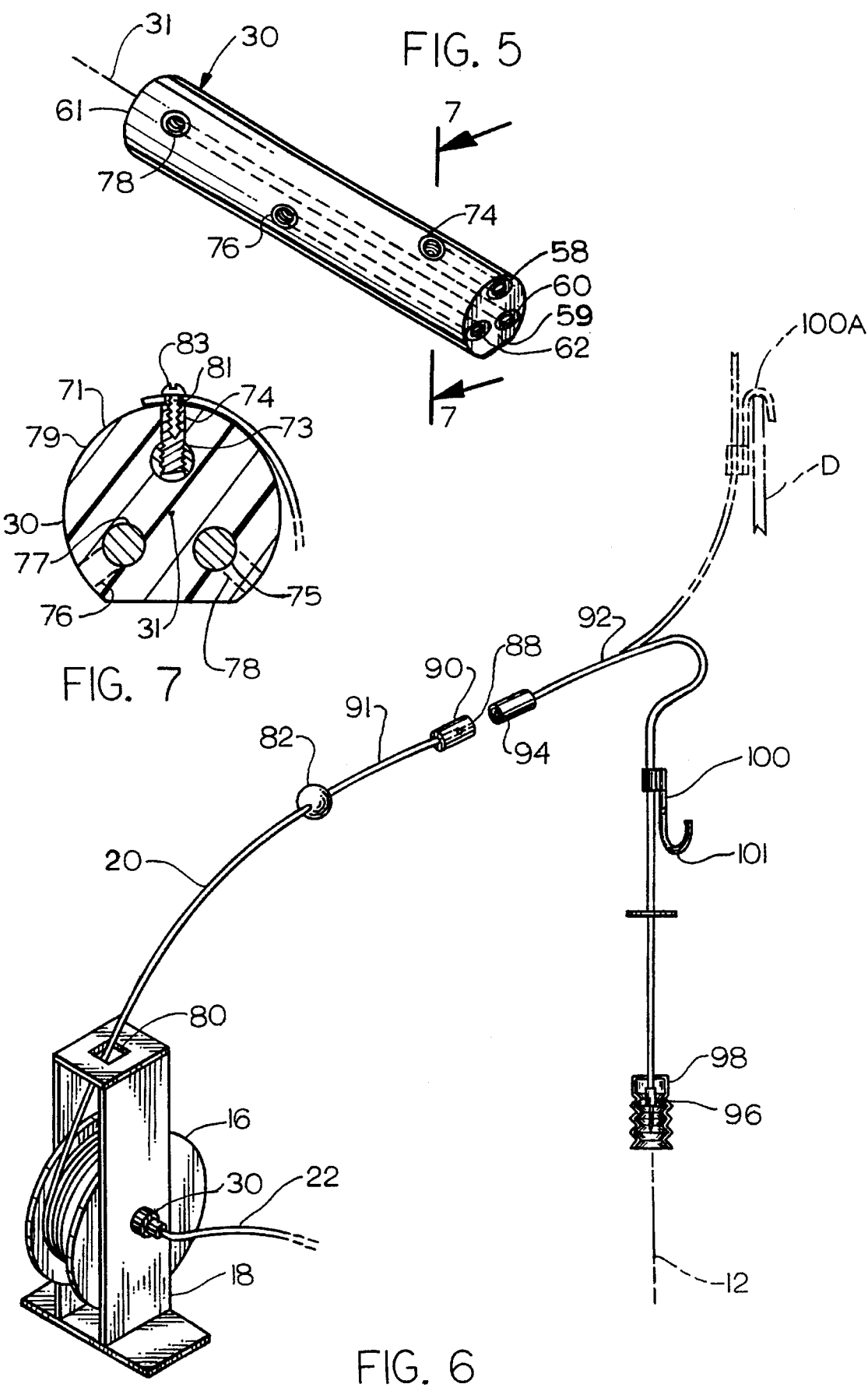

CABLE RETRACTION SYSTEM

BACKGROUND OF THE INVENTION

The present invention relates to cable retraction systems where springs turn a windup drum and carry currents.

One type of cable windup system uses spiral springs to turn a windup drum and to carry currents between a windup cable and a stationary cable. A flat slotted end of each spring is pressed against a surface of the windup reel to extend tangentially thereto, and a screw is used to hold the spring end in place. Because of the varying force constantly acting on the outer spring end, it is difficult to reliably connect the spring end to the windup drum and to a wire of the windup cable.

SUMMARY OF THE INVENTION

In accordance with one embodiment of the present invention, a cable retraction system is provided which is of reliable construction. The system includes a plurality of spiral windup springs for turning a windup drum of a reel. Each spring has an inner end mounted on an axle and an outer end mounted on a windup drum. The drum has a plurality of through slots, and the outer end of each spring is bent into a largely 180° loop that extends through a slot in the drum, with an outer leg of each loop lying on the windup surface of the drum. Each wire of the windup cable has a lug at its end. The outer leg of the spring loop is sandwiched between the wire lug and a metal insert embedded in the drum, with a screw extending through them and threadably connected to the insert to hold them together.

The axle includes a dielectric body and a plurality of axle conductors embedded in the body. Each axle conductor extends primarily parallel to the axis of the axle. Each conductor has an outer end lying at an end of the axle where it connects to a wire of a stationary second cable. Each conductor has an inner end that extends to the periphery of the axle where it connects to an inner end of the spring. The inner end of each spring is permanently deformed to substantiate the radius of curvature of the axle periphery, and a screw extends through a hole in the spring inner end and through a hole at the inner end of the axle conductor.

The novel features of the invention are set forth with particularity in the appended claims. The invention will be best understood from the following description when read in conjunction with the accompanying drawings.

BRIEF DESCRIPTION OF THE DRAWINGS

FIG. 5 is an isometric view of the axle of the apparatus of FIG. 2.

FIG. 6 is an isometric and exploded view of the system of FIG. 1.

FIG. 7 is a view taken on the 7—7 of FIG. 5.

DESCRIPTION OF THE PREFERRED EMBODIMENT

Figure 1:
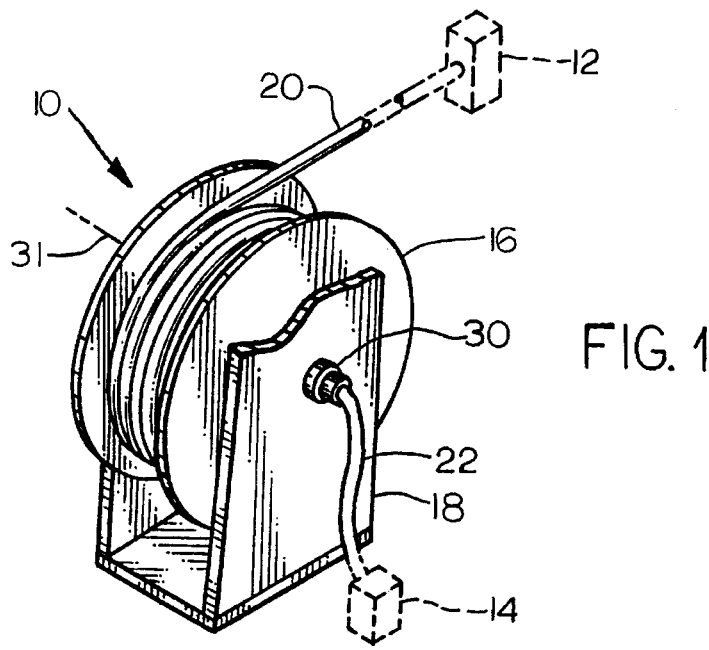
FIG. 1 is an isometric view of a portion of a cable retraction system of the invention.

FIG. 1 shows a cable retraction system 10 for electrically coupling a pair of audio transceivers 12, 14 that each may comprise a headset (earphone and microphone). In one example, one transceiver is worn by a person on an airplane that is being serviced at a noisy airport, and the other is worn by a person who is servicing equipment that may lay one hundred feet away. The system comprises a cable reel 16 that is rotatably mounted on a frame 18 that is designed to rest on the ground. A windup cable 20 that is coupled to the first audio transceiver at 12, is retractably wound about the reel 16. A second cable 22 that is coupled to the second audio transceiver, extends from a stationary axle 30 lying at the axis 31 of the apparatus, about which the reel 16 turns.

Figure 2:
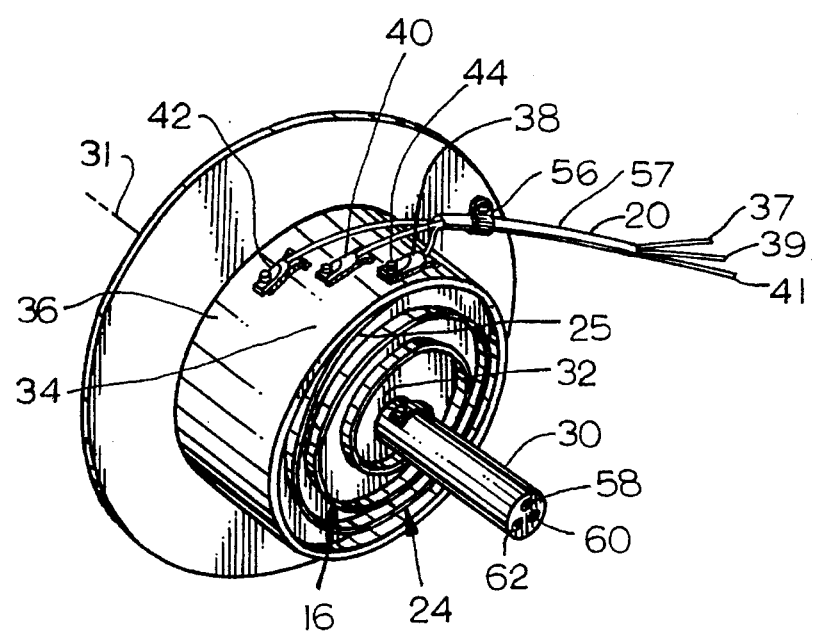
FIG. 2 is a sectional isometric view of the reel end axle of the system of FIG. 1.

As shown in FIG. 2, the windup cable 20 has three wires 37, 39, and 41, that each has a conductive lug 38, 40, 42 at its end (each lug is connected to a conductor of the wire). Each lug is mounted on the outer surface or periphery of a windup drum 36 of the reel. The system includes three power springs, including power spring 24 which has an outer end 25 connected to a corresponding wire lug 38, and which has an inner end 32 mounted on the axle 30. The inner end 32 of the power spring is connected to a corresponding axle conductor 58 which connects to a wire of the second cable.

Figure 4:
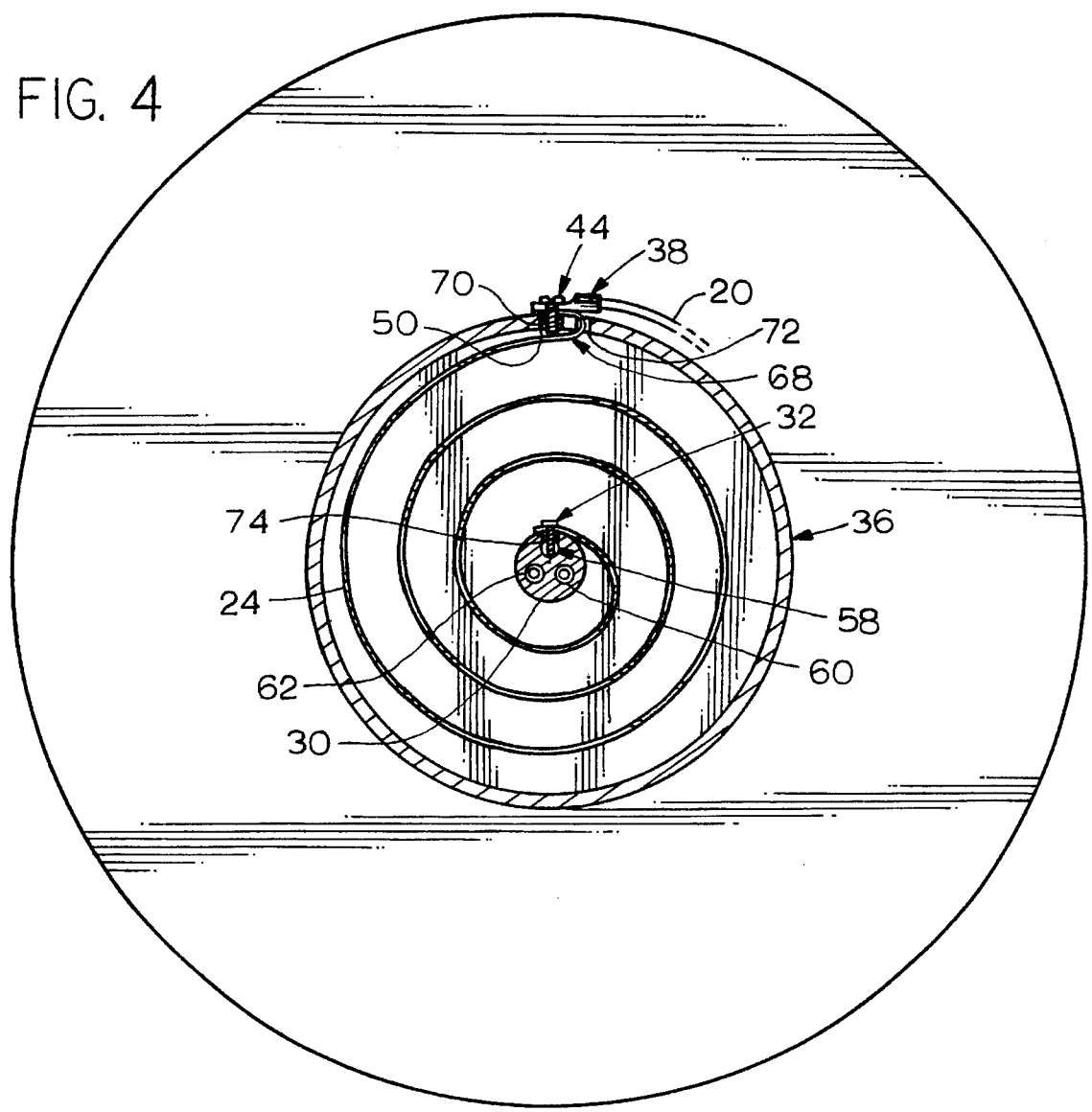
FIG. 4 is a view taken on the line 4—4 of FIG. 3.
Figure 4A:
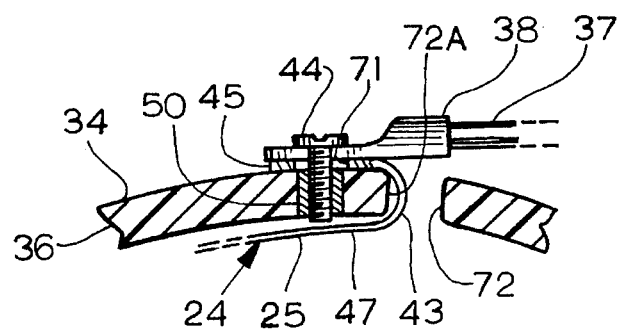
FIG. 4A is an enlarged view of a portion of the apparatus of FIG. 4.

FIG. 4A shows the manner in which the outer end 25 of the spring 24 is connected to the wire 37 of the windup cable. The windup drum 36 is substantially in the form of a hollow cylinder, with the windup cable being wrapped about its outer surface 34. The windup drum has a plurality of slots 72. The outer end 25 of each spring is bent into a substantially 180° loop 43 that has outer and inner loop sides 45, 47. The center of the loop at 43 extends through a slot 72 in the windup drum, with the outer loop side 45 lying on the outer surface 34 of the drum. A threaded insert 50 is set (as by force fit) in a hole in the windup drum. The outer loop side 45 of the spring is sandwiched between the lug 38 and the insert 50, and a screw 44 projects through holes in the lug and spring and is threadably connected to the threaded insert 50. Tension on the spring 24 can lead to slight bending of the loop 43 and pressure of it on one side 72A of the slot 72 in the drum. As a result, the changing forces on the outer end 25 of the spring, as the cable is wound and unwound from the windup drum, are largely isolated from the outer leg 45 of the spring loop. This minimizes the tendency for the mounted location of the spring end at outer loop side 45 to loosen the screw. This arrangement provides a relatively simple and reliable mounting of the spring outer end and its electrical coupling to one of the cable wires 37.

FIGS. 5 and 7 show details of the axle 30. The axle includes a body 71 (FIG. 7) of dielectric, or insulative material, and a plurality of axle conductors 73, 75, and 77 embedded therein. Each axle conductor extends primarily parallel to the axis 31, but includes a threaded insert such as 74 extending to the periphery 79 of the dielectric body. The spring inner end 32 is permanently deformed to have about the same radius of curvature as the dielectric body (i.e. not more than twice as great), and has a hole 81 therein. A screw 83 projects through the hole and into the threaded insert 74 to anchor the inner end of the spring to the axle and to electrically connect the inner end of the spring to a corresponding axle conductor 73. The axle has opposite ends 59, 61. Each axle conductor has an outer end 58, 60, 62 (FIG. 5) which lies at a first axle end and which is opposite the conductor inner end (at one of the inserts 74 etc.). The outer ends of the axle conductors are internally threaded, so a screw can pass through a lug on a wire of the second cable and connect into a threaded conductor end 58, 60, 62. Applicant prefers to embed the axle conductors by molding them in place in the axle body.

Figure 3:
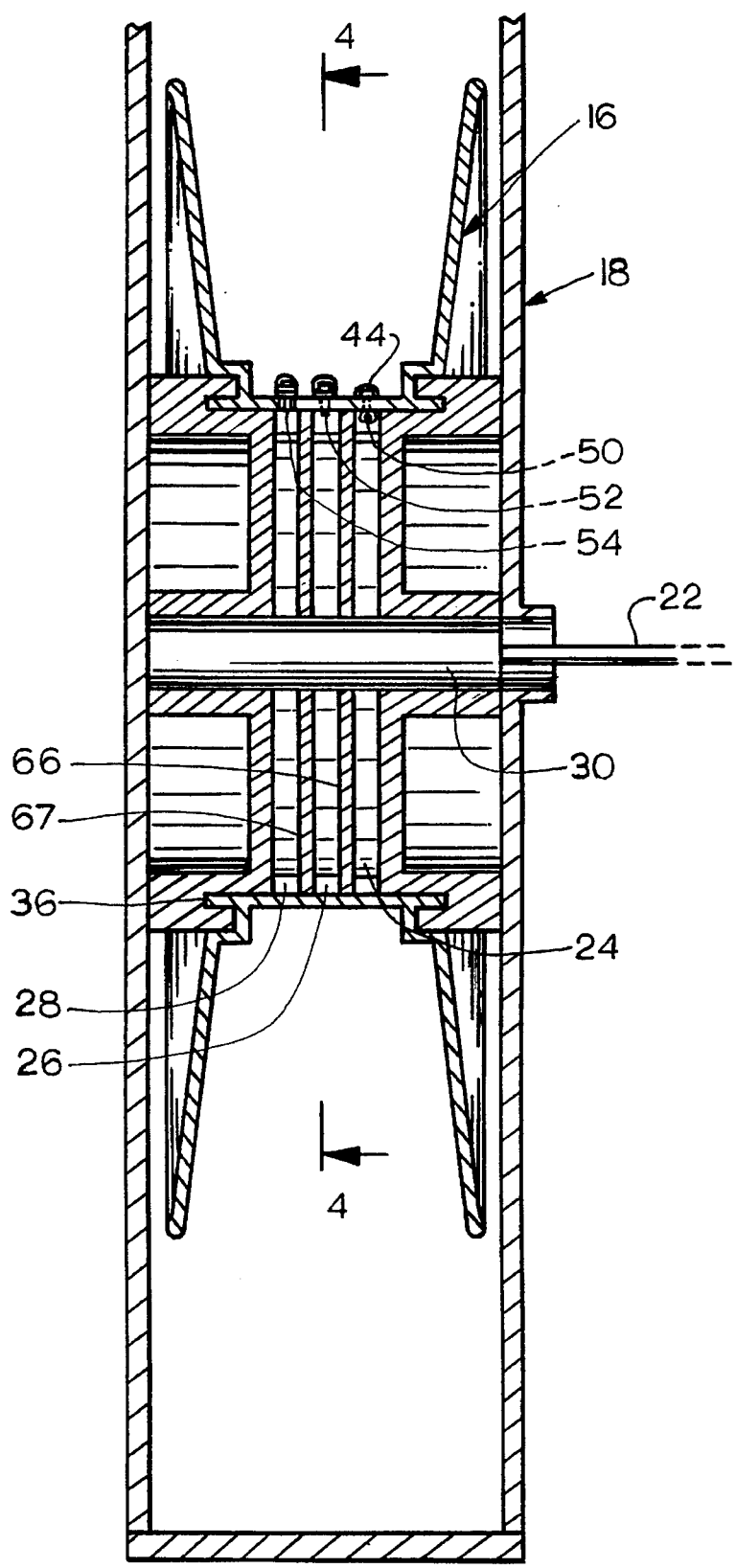
FIG. 3 is a vertical sectional view of the apparatus of FIG. 1.

FIG. 3 shows how the three power springs 24, 26, 28 are positioned, so they are axially spaced apart by insulative sheet-like spacers 66, 67. FIG. 2 shows that the conductive lugs 38, 40, 42 on wires of the windup cable 20, are not only axially spaced along the axis of rotation 31, but are also circumferentially spaced. The circumferential spacing helps separate the spring ends and wire lugs from one another to avoid contact of one spring and/or lug with another. A strain relief device 56 is fixed to the windup cable 20 at a location where the cable sheath 57 surrounds the wires, with the location being spaced from the wire ends at the lugs 38, 40, 42. The strain relief device is mounted on one of the flanges 85 (which lies opposite another flange 87) of the reel. As can be seen in FIG. 5, the outer ends at 74, 76, 78 of the axle conductors are also circumferentially spaced about the axle axis 31. The circumferential spacing corresponds to the circumferential spacing of the lugs 38, 40, 42 (FIG. 2) at the outer ends of the springs. The circumferential spacing of the inner ends of the axle conductors facilitates construction of the axle, and also results in substantially equal tension in each of the three springs when substantially identical power springs are used.

FIG. 6 shows additional details of the cable retraction system 10. The windup cable 20 includes first and second cable sections 91, 92 which are connected by plug and socket connectors 88, 94. The plug and socket connectors are designed to unmate when a predetermined force such as twenty pounds is applied that tends to pull them apart. This construction is used because damage to the windup cable and to instruments it is connected to, often occurs by inadvertent pulling of the cable, as where the far end of the cable is connected to an instrument on an airplane, and is not disconnected when the airplane is taxied to another location.

The windup cable has a far end with another plug 96, and with a handle/protective boot 98 therearound. A mounting bracket 100 is attached to the cable a predetermined distance such as six feet from the plug 96. The bracket 100 can be hung on an object such as a door or open panel on an airplane. FIG. 6 shows at 100A how the bracket can be mounted on a door D, the bracket including a substantially 180° loop to allow it to be easily hung on a door. Applicant constructs the bracket 100 of elastomeric material such as rubber. As a result, if the cable is pulled, the elastomeric loop 101 of the bracket will unbend from its loop position and will release from the door, at a force such as twenty pounds.

The cable moves through a hole or passthrough 80 in the frame 18. A hollow elastic ball or sphere 82 is fixed to the windup cable, and is larger than the hole 80. As a result, if the cable is released to wind up, it will be stopped when the sphere 82 hits the walls of the hole 80. The elastomeric sphere reduces shock from sudden stopping of the cable, and avoids creation of a loud noise.

Thus, the invention provides a cable retraction system of high reliability. The system includes a plurality of windup springs with inner ends mounted on a fixed axle and outer ends connected to a windup drum. The outer ends of the springs are bent into a largely 180° loop that passes through a slot in the windup drum. The outer leg of the loop is sandwiched between a metal insert in the drum and a lug at the end of a wire of a windup cable, and with a screw holding them together. The stationary axle includes a dielectric body and a plurality of axle conductors lying in and preferably embedded in the body. Each axle conductor has an inner end extending to the periphery of the body and connected to the inner end of the windup spring. Each axle conductor also has an outer end lying at an axial end of the axle, where the conductor connects to a wire of a second cable. Precautions are taken to avoid damage to the cable retraction system or to apparatus to which the windup cable is connected, which includes providing the windup cable in two sections connected by plug and socket connectors that unmate at a predetermined unmating force, and by providing a mounting bracket with an elastomeric loop. A hollow elastic ball on the cable gently limits cable windup.

Although particular embodiments of the invention have been described and illustrated herein, it is recognized that modifications and variations may readily occur to those skilled in the art, and consequently, it is intended that the claims be interpreted to cover such modifications and equivalents.

We claim:

1. A cable retraction system comprising:

a frame;

a stationary axle mounted on said frame;

a reel rotatably mounted about a reel axis on said frame, said reel including a windup drum;

a windup cable which has a plurality of first wires, each first wire having one end mounted at one of a plurality of different connection locations on said drum;

a plurality of power springs, each extending in a spiral about said axle with said springs being axially spaced apart, each spring having an inner end mounted on said axle and an outer end mounted on said windup drum;

a second cable which has a plurality of second wires, each second wire electrically coupled to the inner end of a different one of said springs;

said windup drum has a plurality of slots, and said spring outer ends are each being bent in a largely 180° loop with each loop extending through one of said slots in said windup drum, and with one side of each loop lying on the outside of said drum and attached to one of said first wire ends and to said drum.

2. The system described in claim 1 wherein:

said spring outer ends each includes an outer loop part with a hole therein;

each of said first wire ends includes a lug with a hole; and including a plurality of threaded inserts, each mounted in said windup drum at one of said connection locations;

said outer loop parts of said springs are each sandwiched between one of said lugs and one of said inserts, and including a plurality of screws, each extending through a hole in one of said lugs, through a hole in one of said spring outer loop parts and into one of said inserts and threadably engaged with the insert.

3. The system described in claim 1, wherein:

said windup cable includes a sheath around most of the lengths of said first wires;

said reel has opposite flanges on opposite sides of said windup drum; and including a strain relief device mounted on a first of said flanges, with a location along said windup cable where said sheath surrounds said first wires being mounted on said strain relief device, and with each of said first wires first separating from one another of a location between said strain relief device and said one end of each of said first wires.

4. The system described in claim 1, including a hollow elastomeric sphere attached to and surrounding said windup cable;

said frame has a pass-through hole, with said windup cable extending through said pass-through hole, said elastic sphere lying on a side of said pass-through hole opposite said reel, and said elastomeric sphere being larger in diameter than said pass-through hole.

5. A cable retraction system which includes a frame, a stationary axle mounted on said frame, a reel rotatably mounted about a reel axis on said frame, said reel including a windup drum, a windup cable which has a plurality of first wires, each first wire having one end mounted at a different connection location on said drum, a plurality of power springs each extending in a spiral about said axle with said springs being axially spaced apart, each spring having an inner end mounted on said axle and an outer end mounted on said windup drum, a second cable which has a plurality of second wires with each second wire electrically coupled to the inner end of a different one of said springs, characterized by:

said windup cable includes primary and secondary cable sections, said primary cable section having a portion wound on said windup device, and plug and socket connectors attached to said cable sections and constructed to mate and constructed to separate at a predetermined pull-apart force;

a mounting bracket which is mounted on said secondary cable section and which has a substantially 180° loop of elastomeric material forming a hook for hooking on the top of a door.

6. A cable retraction system which includes a frame, a fixed axle mounted on said frame, a reel which is rotatably mounted on said frame and which has a windup drum, a windup cable which is wound on said drum and which has a plurality of first wires, a second cable extending from said axle and having a plurality of second wires, and a plurality of power springs that each has an inner end fixed to said axle and coupled to one of said second wires and an outer end fixed to said windup drum and coupled to one of said first wires, to carry currents and to apply torque tending to turn said reel, wherein:

said windup drum has a first slot, and a first of said springs has an outer end bent in a largely 180° loop that extends through said slot, with an outer side of said loop lying on the outside of said drum and attached to one of said first wire ends and to said drum.

7. The system described in claim 6 wherein:

said outer side of said loop has a hole;

said one of said first wire ends has a lug with a hole;

a fastener having a head and having a shank extending through said holes in said loop outer side and in said lug and fastened to said windup drum, with said loop outer side and said lug being sandwiched between said fastener head and said drum.

* * * * *